April 24, 1945.	A. H. FRENCH	2,374,276
ENGINE AND PROPELLER CONTROL
Filed Oct. 16, 1941	2 Sheets-Sheet 1
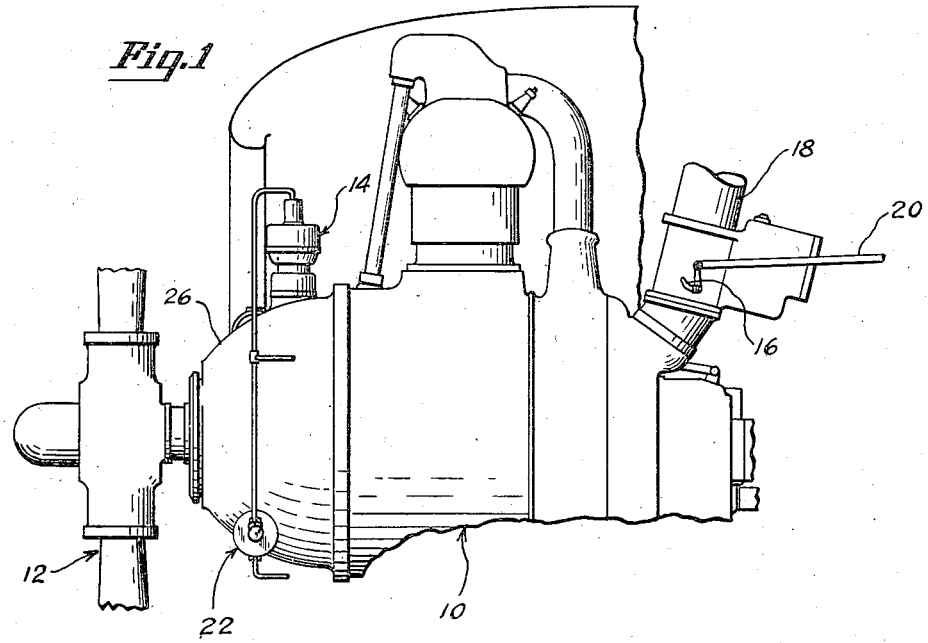
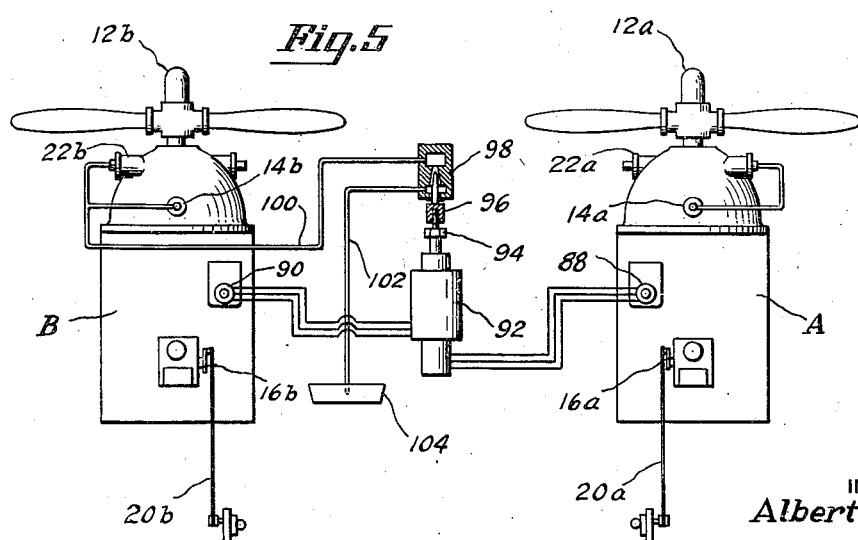
INVENTOR
Albert H. French
BY Harris G. Luther
ATTORNEY.

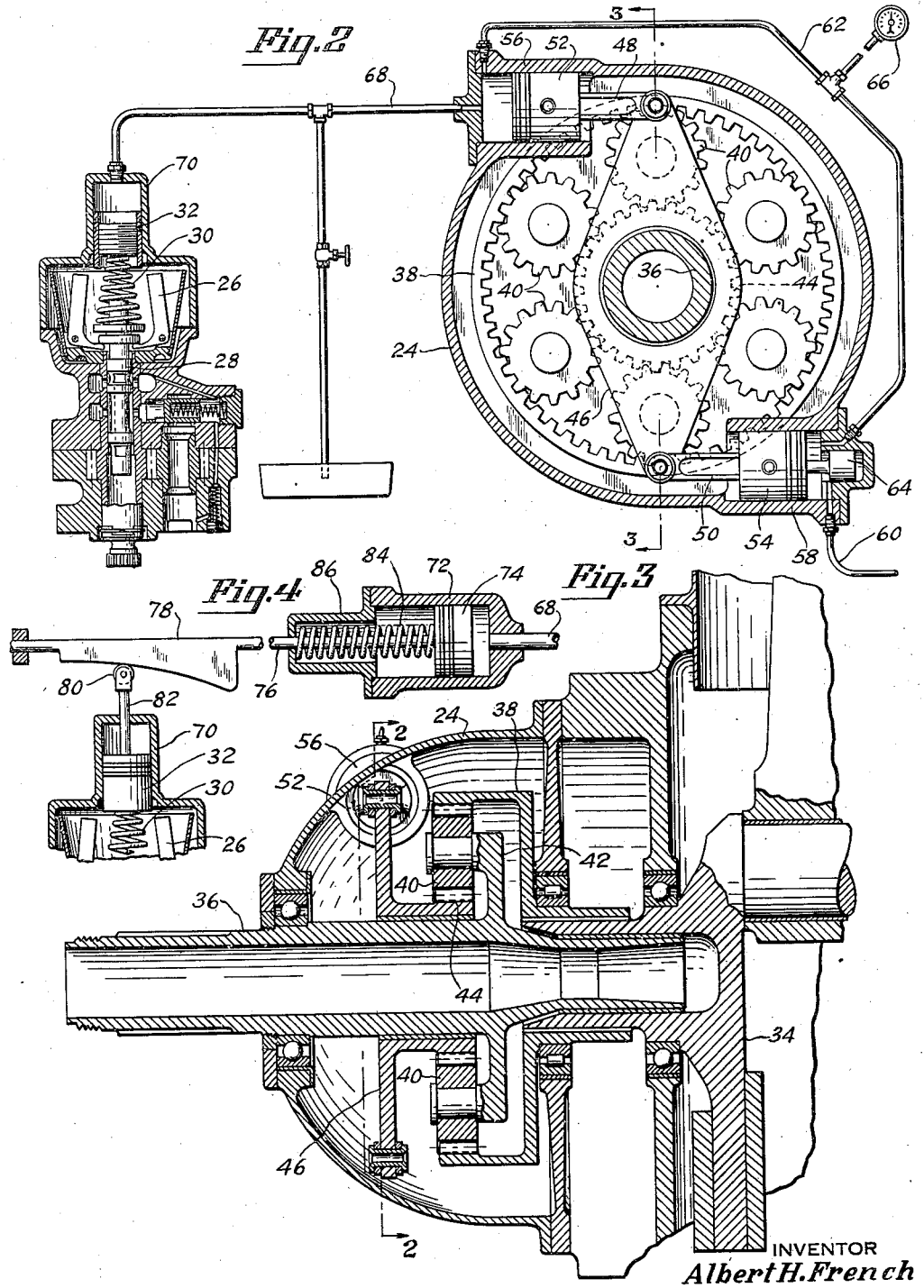

Patented Apr. 24, 1945

2,374,276

UNITED STATES PATENT OFFICE 2,374,276

ENGINE AND PROPELLER CONTROL

Albert H. French, Beverly Hills, Calif., assignor to United Aircraft Corporation, East Hartford, Conn., a corporation of Delaware Application October 16, 1941, Serial No. 415,255

5 Claims. (Cl. 170—135.6)

This invention relates to improvements in control means for aircraft power plants and has particular reference to an improved control for a power plant including an engine and a constant-speed controllable-pitch propeller.

An object of the invention resides in the provision of an improved control for an aircraft power plant of the character indicated which requires but a single manually operable controlled element.

A further object resides in the provision of an improved aircraft power plant control of the character indicated which will automatically change the propeller pitch toward a higher pitch setting upon engine failure so that the blades of a feathering-type propeller can be quickly and easily turned to their feathered position before further injury is caused to the engine by the windmilling of the propeller.

A still further object resides in the provision of an improved aircraft power plant control means of the character indicated which is effective to maintain the propeller in a relatively high pitch position while the engine torque is low to thereby limit the engine speed to safe values in the event the engine power is suddenly increased from low power or idling operation.

An additional object resides in the provision of an improved aircraft power plant control of the character indicated which automatically correlates the engine torque with the engine speed in such manner that there is always a definite predetermined relationship between the torque and speed of the engine and both of these factors of engine operation can be regulated in a predetermined manner by adjusting the engine throttle to control the engine power output.

Another object resides in the provision of aircraft power plant control means which can be readily utilized to synchronize the speed of the engines of a multi-engine aircraft.

Other objects and advantages will be more particularly pointed out hereinafter or will become apparent as the description proceeds.

In the accompanying drawings, in which like reference numerals are used to designate similar parts throughout, there is illustrated a suitable mechanical arrangement for the purpose of disclosing the invention. The drawings, however, are for the purpose of illustration only and are not to be taken as limiting or restricting the invention since it will be apparent to those skilled in the art that various changes in the illustrated arrangements may be resorted to without in any way exceeding the scope of the invention.

In the drawings,

Fig. 1 is a somewhat schematic elevational view of a fragmentary portion of an aircraft power plant showing the application of control means arranged according to the invention thereto.

Fig. 2 is a somewhat schematic sectional view of the improved control means.

Fig. 3 is a sectional view through the forward portion of an aircraft engine showing the application thereto of a torque responsive mechanism which constitutes a portion of the control means illustrated in Fig. 2.

Fig. 4 is a somewhat schematic sectional view of an alternative connection between the torque responsive means and the propeller pitch regulating governor illustrated in Fig. 2, and Fig. 5 is a diagrammatic illustration of the improved control means when adapted to synchronize the speed of two or more engines.

Referring to the drawings in detail, and particularly to Fig. 1, the numeral 10 generally indicates an aircraft engine such as a radial air-cooled type of engine ordinarily employed for this purpose although the invention is in no way limited to any particular type of engine. The numeral 12 generally indicates a controllable-pitch propeller driven by the engine 10 which propeller may be a hydraulically actuated feathering-type well known to the art and particularly illustrated and described in United States Patent No. 2,174,717, issued October 3, 1939, to Frank W. Caldwell et al. for Multi-position controllable pitch propellers. The pitch of the propeller 12 is regulated by a speed responsive governor generally indicated at 14 and the power of the engine is controlled by a throttle 16 located in the engine intake 18 and controlled by manually actuatable means including the link 20. The numeral 22 generally indicates a torque responsive mechanism ordinarily referred to in the art as a torque meter, carried on the front end of the engine 10 and operatively associated with the transmission gearing for the propeller as will presently be described.

In the arrangement illustrated, the governor 14 is mounted on the engine nosepiece 26 and is driven from the engine by a suitable gear train, not shown. This governor includes a pair of centrifugally actuated flyweights 26 acting on a valve stem 28 and opposed by a speeder spring 30. The counterweights and the speeder spring move the valve stem in accordance with variation in engine speed and cause the valve to control the connection of the propeller pitch changing motor with a source of fluid under pressure and a drain channel thus causing the propeller pitch to vary in a manner opposing any change in engine speed. One end of the spring 30 bears against an adjustable abutment 32 which may be moved to vary the loading on the speeder spring and thereby alter the speed setting of the governor.

As is particularly shown in Fig. 3, the engine crankshaft 34 is connected with the propeller shaft 36 through a planetary reduction gear including the ring gear 38 drivingly connected with the crankshaft, the planetary gears 40 carried on the cage 42 drivingly connected with the propeller shaft 36 and the reaction gear 44 with which the planetary gears 40 mesh in addition to the ring gear 38. With this arrangement the force exerted on the reaction gear 44 is a direct indication of the torque transmitted to the propeller shaft 36. The reaction gear is provided with a double ended lever member 46 the ends of which are operatively connected, by means of suitable links or rods 48 and 50, with respective pistons 52 and 54 reciprocable in respective cylinders 56 and 58 carried by the engine nosepiece 24. Hydraulic fluid under pressure is supplied to the spaces between the piston and the closed ends of the cylinders from a fluid pressure line 60 and conduit 62 interconnecting the spaces in the two cylinders. The fluid supply is controlled by a valve 64 operated by one of the pistons, for example the piston 54, in such a manner that the fluid under pressure maintains the pistons spaced a substantially constant distance from the closed ends of the respective cylinders. The pressure of the fluid in the spaces between the pistons and the closed ends of the cylinders will then constitute a direct indication of the torque applied to the propeller shaft and this pressure may be indicated, in torque units if desired, by a suitable gauge 66.

In order to correlate the engine torque with the engine speed, a conduit 68 is led from the system containing the fluid at torque indicating pressure to the interior of a cylinder 70 within which the movable abutment 32 for the speeder spring 30 is reciprocably received, the conduit being led to the space between the closed end of this cylinder and the movable abutment.

With this arrangement, the torque applied by the engine to the propeller shaft is imposed through the fluid medium on the abutment 32 in a manner such that the speed setting of the governor is adjusted in direct relation to changes in engine torque. That is, when the engine torque increases the governor is changed to a higher speed setting, causing, by a decrease in the pitch angle of the propeller, if necessary, a faster engine speed. This provides an operating condition under which the engine power can be varied throughout the entire operative range by manual adjustment of the engine throttle 16 and it is not necessary to manually adjust the governor in order to obtain any desired engine power output.

Several advantages accrue from this method of operation. For one, the engine can be adequately controlled by a single manually operated control element namely the throttle, for another, the engine and propeller are automatically set for optimum operating conditions for different maneuvers. For example, for take-off at high engine power, the propeller pitch is reduced enough to permit high propeller speed and the highest pitch setting compatible with the desired speed and the allowed engine power output thereby permitting the propeller to develop the maximum static thrust for the take-off. This operating condition also provides a desired speed and blade pitch setting for cruising since, after the take-off is complete and the airplane is leveled off and cruising conditions initiated, the engine power is greatly reduced by closing the throttle with a consequent reduction in the torque delivered at take-off speed. The relationship between the torque meter and the governor can be so arranged that a relatively small throttling of the engine from wide open throttle will produce a considerable increase in the propeller blade pitch angle thus causing the power plant to operate at a relatively slow speed and large throttle opening which is the optimum cruising condition especially from the point of view of minimum fuel consumption.

The proper coordination between engine speed and engine torque may be obtained in some installations by properly proportioning the area of the abutment 32 to the strength of the spring 30 and the pressure of the fluid in the conduit 68. In case it should be impossible in certain other installations to accomplish the proper torque speed ratios by the correct evaluation of the above mentioned factors, some other arrangements for changing the governor setting may be provided, such for example, as that illustrated in Fig. 4. In this arrangement, the fluid conduit 68, instead of being connected directly with the abutment of cylinder 70 is connected to one end of the cylinder 72 of a servo-motor disposed between the torque meter and the governor. Within the cylinder 72 there is a reciprocable piston 74 connected by a rod 76 with a cam 78 which contacts a cam follower 80 carried upon the projecting end of a stem 82 extending from the abutment 32 out of the cylinder 70 through the closed end of this cylinder. With this arrangement, movements of the piston 74 effected by pressure of the fluid in the conduit 68 will cause the cam 78 to move across the stem 82 and adjust the abutment 32 to change the loading on the speeder spring 30. Movement of the piston 74 by the pressure fluid may be resisted by a compression spring 84 surrounding the rod 76 and bearing at one end against the piston and at the other end against an abutment member 86 secured to the cylinder 72.

The fact that the track of the cam 78 may be varied almost infinitely gives to this form of adjusting mechanism a greater flexibility which renders it possible to properly coordinate the speed setting adjustment of the governor to the engine torque for practically any installation.

Since this arrangement maintains the engine power at a definite predetermined relationship to engine speed, an indication of engine speed would also indicate the horse power being developed by the engine and, if desired, a tachometer could be used calibrated directly in engine power units.

The improved control may be utilized to synchronize the speeds of two or more engines by a suitable arrangement such as that illustrated in Fig. 5. In this arrangement the engine A functions as the master engine and the speed of the engine B is synchronized with that of the engine A. The engine A is provided with a control such as has been described above and in addition drives an electric current impulse generator 88. The engine B is also provided with a control as described above and drives a similar current impulse generator 90. The two generators 88 and 90 are connected to the stator and rotor portions of an electrical differential or "Selsyn" unit 92 the rotatable portion of which is drivingly connected with a shaft 94 screw threaded into the plunger 96 of a needle valve device comprising the valve member 98 and the valve seat casing 98. A conduit 100 leads from the torque meter of the controlled engine to the needle valve and a drain conduit 102 leads from the needle valve to a fluid reservoir 104 which may be an engine sump or oil storage tank.

The operation of this synchronizing apparatus is substantially as follows:

If oil is bled from the torque meter 22b of the controlled motor this fluid will be made up to a certain extent by the pressure fluid entering the torque meter from the pressure line 60, the extent of the make up depending upon the restriction of the fluid pressure line 60 and the restriction of the bleed. With this continuous replenishment of the fluid in the torque meter and with the needle valve 96 arranged to bleed, at its maximum capacity, fluid from the torque meter somewhat more rapidly than it can be replenished from the fluid pressure line, the fluid pressure in the torque meter 22b acting on the abutment 32 of the respective engine governor or the piston 74 of the respective servo-motor can be regulated and will in turn regulate the speed setting of the respective governor. The opening of the valve 96 is controlled by the electric differential device 92 in such a manner that if the speed of the controlled engine B lags behind that of the master engine A the needle valve 96 will be closed thereby increasing the pressure in the torque meter 22b of the controlled engine and resulting in an increased speed setting of the governor 14b and a consequent increase in the speed of the controlled engine until the speed of the master engine is matched. If the speed of the controlled engine exceeds that of the master engine A the needle valve 96 would be opened by the electric differential device thereby reducing the pressure in the torque meter 22b resulting in a lowered speed setting of the governor 14b and a decrease in the speed of the controlled engine until the speed of the controlled engine matches the speed of the master engine. Thus the improved control device with the addition of very few elements can be adapted to synchronize the speed of a controlled engine to a master speed.

While a suitable mechanical embodiment has been hereinabove described and illustrated in the accompanying drawings for the purpose of disclosing the invention, it is to be understood that the invention is not limited to the particular embodiment so described and illustrated but that such changes in the size, shape and arrangement of the various parts may be resorted to as come within the scope of the sub-joined claims.

Having now described the invention so that others skilled in the art may clearly understand the same, what it is desired to secure by Letters Patent is as follows:

1. In combination with a reference speed device, means for synchronizing the speed of a power plant, including an engine, a load varying device, a governor controlling said load varying device and means for changing the speed setting of said governor, with said reference speed device, said synchronizing means comprising, a hydraulic torque responsive device operatively associated with said engine, means operatively connecting said torque responsive device with the governor speed setting means to control the speed of said power plant in response to torque variations, a valve for regulating the fluid pressure in said torque responsive device and means for controlling said valve comprising a generator driven by said power plant, a generator driven by said reference speed device and an electrical differential unit operatively associated with said valve and connected with said generators.

2. In combination with a power plant including an engine, a controllable pitch propeller and a pitch controlling speed governor mounted on a stationary support, a throttle for varying the torque of said engine, manually operable means for controlling said throttle, means responsive to variations in the torque of said engine, including an expansible chamber device, applying pressure to hydraulic fluid in proportion to the torque value, a speeder spring for said governor, means for adjusting the speed setting of said governor comprising an expansible chamber device for changing the force exerted by said speeder spring, an hydraulic line operatively connecting the torque responsive expansible chamber device with the speeder spring adjusting expansible chamber device to change the speed setting of said governor in accordance with variations in engine torque.

3. In combination with a power plant including an engine, a controllable-pitch propeller, and a speed governor controlling propeller pitch changes, and a throttle for said engine, manually operable means for controlling said throttle, means responsive to variations in the torque of said engine, and means operatively connecting said torque responsive means with said speed governor to change the speed setting of said governor in accordance with variations in engine torque, and comprising a cam and cam follower the face of said cam being shaped to provide a predetermined relationship between the torque developed by said engine and the speed setting of said governor.

4. In combination with a power plant including an engine, a controllable-pitch propeller, a pitch controlling speed governor, and a throttle for varying the torque of said engine, a unitary speed and torque control comprising manually operable means for controlling said throttle, means responsive to variations in the torque of said engine, including an expansible chamber device, applying pressure to liquid in proportion to the torque value, a speeder spring for said governor, means for adjusting the speed setting of said governor comprising, a cam device, and an expansible chamber device changing the position of said cam device for changing the force exerted by said speeder spring, a liquid line operatively connecting the torque responsive expansible chamber device with the speeder spring adjusting expansible chamber device to change the speed of setting of said governor in accordance with variations in engine torque, said cam device being shaped to provide a predetermined relation between the torque developed by said engine and the speed setting of said governor.

5. In combination with a reference speed device and a power plant, including an engine, a load varying device, a governor controlling said load varying device, and means for changing the speed setting of said governor, means for synchronizing the speed of said power plant with the speed of said reference speed device comprising, a hydraulic torque responsive device operatively associated with said engine, means operatively connecting said torque responsive device with the governor speed setting means to control the speed of said power plant in response to torque variations, means for maintaining the supply of fluid in said torque responsive device, a valve for regulating the fluid pressure applied by said torque responsive device to said governor setting means, and means for controlling said valve comprising, a generator driven by said power plant, a generator driven by said reference speed device, and an electrical differential unit operatively associated with said valve and connected with said generators.

ALBERT H. FRENCH.